Sept. 29, 1942.  C. MARKES  2,297,489

TOY DRIVING WHEEL

Filed Aug. 21, 1941

Inventor:
CARL MARKES
BY
Richards & Geier
ATTORNEYS

Patented Sept. 29, 1942

2,297,489

UNITED STATES PATENT OFFICE 2,297,489

TOY DRIVING WHEEL

Carl Markes, Ludenscheid, Germany; vested in the Alien Property Custodian

Application August 21, 1941, Serial No. 407,737 In Germany September 11, 1940

6 Claims. (Cl. 46—221)

This invention relates to a toy driver, as a pinion, gear, pulley, sheave, etc., attachable to round shafts or axles and substantially produced from nonmetallic materials, as synthetic plastics. The driver is fitted with a separate hollow sheet metal hub member nonrotatably holding a rubber sleeve whose internal diameter is smaller than the cross section of the shaft or axle, and connection between the shaft or axle and the rubber sleeve is effected in a torque transmitting manner by the friction of the sleeve and by means of a nose radially projecting from the hollow hub member and engaging a slot in the round shaft or axle.

The novelty of the invention resides in constructing the hollow hub member in the form of a bushing which can be inserted in the bore of the nave of the driver and whose front walls are interconnected by tongues bent off from one wall in an axially parallel manner and clamped to the other wall. The tongues are disposed in clearances of the nave of the driver, which also consists of nonmetallic material.

The invention affords the advantage of replacing metal by less valuable nonmetallic materials and of simplifying, and reducing the cost of, the production of the driver. Furthermore, a driver constructed according to the invention can be rapidly assembled, since the hollow sheet metal bushing need merely be inserted in the nave of the driver and its parts can be firmly connected and attached to the driver simply by bending the ends of the tongues of one of the walls of the bushing around the edge of the other wall.

Figure 1:
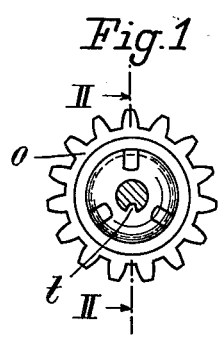
Figure 2:
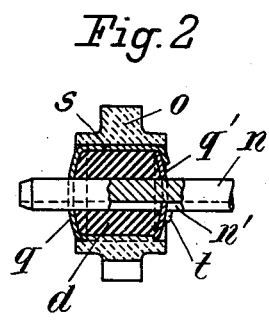
Figure 3:
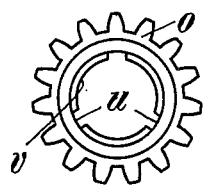

One form of the invention is illustrated by way of example in the accompanying drawing, in which Figure 1 is a side view of a driver having the form of a pinion according to the invention;

Fig. 2, a section on line II—II, of Fig. 1;

Fig. 3, a view of the pinion without the parts to be inserted therein; and

Figure 4:
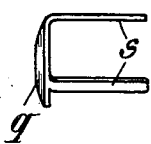
Figure 5:
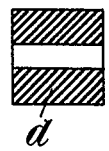
Figure 6:
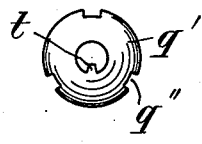

Figs. 4 to 6 are detail views of said parts.

A round shaft or axle $n$ possesses a slot $n'$, and $o$ designates a pinion made of nonmetallic materials, as synthetic plastics. The pinion $o$ is secured against accidental axial displacement on the shaft $n$ by a rubber sleeve $d$ participating in the transmission of torque and having a bore that is smaller than the diameter of the shaft $n$. The rubber sleeve $d$ slipped over the shaft $n$ has therefore a tight fit and is surrounded by a hollow sheet metal member provided with a nose $t$ for engaging the slot $n'$ and transmitting torque. The hollow sheet metal member forms a bushing insertable in the nave of the pinion and comprises two front walls $q$, $q'$ interconnected by tongues $s$ which are bent off from the wall $q$ in an axially parallel manner and whose bent ends are clamped to the wall $q'$ and positioned in close fitting clearances $q''$ of the wall $q'$. Preferably only one of the three parts of the insertable hub bushing, say the wall $q'$, is provided with a nose $t$. The tongues $s$ lie in corresponding clearances $u$ of the nave, also made of nonmetallic material, of the pinion $o$. The nave portions $v$ situated between the clearances $u$ come into direct contact with the rubber sleeve $d$. The cylindrical sleeve $d$ tightly insertable between the portions $v$ is somewhat longer prior to assembly than the portions $v$. After assembly the walls $q$, $q'$ abut against the front faces of the portions $v$ and firmly clamp the sleeve $d$ between them, so that the sleeve expands in radial direction and closely hugs also the portions $v$.

The hub bushing is adapted for use in drivers of all sorts and sizes, as gears, pulleys, sheaves, etc., and a building set for children containing different drivers can thus be produced at lower cost than is possible at present.

What is claimed is:

1. A toy driving wheel having a nonmetallic outer portion and a separate hub member comprising a hollow sheet metal body and a rubber sleeve nonrotatably arranged therein whose opening is smaller than that of the hollow sheet metal member, a nose radially projecting into the hub opening and intended to engage a slot of a round body to be inserted in the wheel, the front walls of said hollow sheet metal member being connected by parallel axially extending tongues bent off from one wall and clamped to the other, said tongues being arranged in clearances of the nonmetallic portion of the wheel.

2. A toy element, comprising a disc- or wheel-like nonmetallic outer portion, a sleeve of resiliently yielding material, a hollow metal body firmly surrounding said sleeve externally and on its front sides and forming therewith a separate hub member, a slotted round body inserted in said hub member and held in frictional engagement with said sleeve, a nose radially projecting from said hub member and engaging the slot of said round body and tongues bent off from one of the front walls of said hollow metal member in an axially parallel manner, said tongues being disposed in clearances of the nonmetallic portion of the toy element and connected to the other front wall of said hollow metal body.

3. A wheellike toy element substantially made of synthetic plastics and fitted with an insertable hub member comprising a hollow sheet metal body and a rubber sleeve nonrotatably arranged therein, the hub opening of said sleeve being smaller than that of the hollow sheet metal body, a nose radially projecting into the hub opening and intended to engage a slot of a round body to be inserted in the wheellike element, the front walls of said hollow sheet metal body being connected by tongues bent off from one wall in an axially parallel manner and clamped to the other wall, said tongues being arranged in clearances of a navelike portion of the nonmetallic part of the wheellike element.

4. A toy driving wheel substantially made from nonmetallic material and fitted with a separate hub member insertable in the nave thereof, said insertable hub member comprising a hollow sheet metal body, a sleeve of resiliently yielding material nonrotatably disposed therein, the hub opening of said sleeve being smaller than that of said hollow sheet metal body, a nose radially projecting into the hub opening and intended to engage a slot of a round body to be inserted in the wheel, one of the front walls of said hollow sheet metal body having tongues bent off in an axially parallel manner, said tongues being disposed in clearances of the nonmetallic nave and of the other front wall and having their ends bent about the latter.

5. A toy driving wheel substantially made from nonmetallic material and fitted with a separate insertable hub member in its nave, said insertable hub member comprising a sleeve of resiliently yielding material and a hollow metal body firmly surrounding said sleeve externally and on the front sides, the hub opening of said sleeve being smaller than that of said hollow metal body, a nose of said insertable hub member projecting radially into the hub opening and intended to engage a slot of a round body to be inserted in the wheel, at least one of the front walls of said hollow metal member possessing axially parallelly bent off tongues disposed in clearances of the nonmetallic nave and connected by their ends with the other front wall, said front walls being sunk into the nonmetallic nave and abutting against the portions thereof located between said clearances.

6. A toy driver according to claim 5, in which the sleeve of resiliently yielding material is insertable in a closely fitting manner between the nave portions and is originally longer than the distance between these portions, said sleeve being compressed by the front walls in longitudinal direction and firmly pressed against said nave portions.

CARL MARKES.